United States Patent Office
3,511,817
Patented May 12, 1970

3,511,817
COPOLYMERS OF VINYL LACTAMS AND
METHODS OF MAKING THE SAME
Marvin M. Fein, Westfield, N.J., Victor K. Jasinski, Dover, Del., and Eugene S. Barabas, Watchung, N.J., assignors to GAF Corporation, New York, N.Y., a corporation of Delaware
No Drawing. Filed Sept. 23, 1968, Ser. No. 761,788
Int. Cl. C08f 19/10, 41/06
U.S. Cl. 260—78.5                                            15 Claims

ABSTRACT OF THE DISCLOSURE

Film forming copolymers of vinyl lactams, e.g., vinyl pyrrolidone and mono or half esters of unsaturated dicarboxylic acids are produced by the copolymerization of a preformed half ester of an unsaturated dicarboxylic acid, e.g., a half ester of maleic acid with vinyl pyrrolidone in the presence of a polymerization catalyst. The copolymers are exceptionally useful in hair spray compositions.

---

The present invention relates to novel copolymers of N-vinyl lactams, e.g., N-vinyl pyrrolidone and unsaturated dicarboxylic acid mono or half esters and, more particularly to film forming copolymers of N-vinyl pyrrolidone and half esters of lower unsaturated dicarboxylic acids and processes for producing the same.

Copolymers of vinyl pyrrolidone and maleic anhydride as well as the anhydrides of other unsaturated dicarboxylic acids are well known in the art. Thus, for example, note U.S. Pat. 2,676,949. While such copolymers do have satisfactory film-forming properties, the copolymers of vinyl pyrrolidone and maleic anhydride are colored and thus cannot be satisfactorily employed in hair spray compositions. Furthermore, such polymers have very poor moisture resistance and are thus unsatisfactory in hair spray resins.

In addition, various attempts have been made to improve the copolymers of vinyl pyrrolidone and unsaturated dicarboxylic acid anhydrides, e.g., maleic anhydride by an esterification process. However, a post esterification of the copolymer of vinyl pyrrolidone and the unsaturated dicarboxylic acid has not improved the properties of the copolymers. Again, a colored product of low molecular weight is produced, such product being unsuitable for use as a hair spray. Here again, also, the polymerization rate is slow requiring high catalyst levels, the process additionally requiring the further step of the esterification after polymerization.

In addition, various copolymers of vinyl pyrrolidone with full esters of unsaturated dicarboxylic acids are known. Thus, for example, note U.S. Pat. 2,980,654 and 2,999,853. While these copolymers do not possess the undesirable color characteristics of the copolymers of vinyl pyrrolidone with the unsaturated dicarboxylic acid anhydrides, the copolymers of vinyl pyrrolidone and full esters of the unsaturated dicarboxylic acids do not possess the requisite film forming properties or characteristics so necessary for use in a hair spray or similar composition, i.e. removable with an alkaline shampoo. Thus, the copolymers prepared from full esters have not been found completely satisfactory in view of the ineffective film forming properties of such materials.

Accordingly, until the present invention there has not been developed any material which would eliminate the deficiencies of the previously prepared materials.

Accordingly, it is the principal object of the present invention to provide novel copolymers of vinyl pyrrolidone which eliminate the inherent deficiencies of previous materials.

A further object of the present invention is to provide novel copolymers of a vinyl lactam, e.g., vinyl pyrrolidone and half esters of unsaturated dicarboxylic acids.

A still further object of the present invention is to provide a method of producing novel film forming copolymers by the copolymerization of a vinyl lactam, e.g., vinyl pyrrolidone and a half ester of an unsaturated dicarboxylic acid.

Still further objects and advantages of the products and composition of the present invention will become apparent from the following more detailed description thereof.

In accordance with the present invention, it has now been discovered that certain copolymers of an N-vinyl lactam, e.g., N-vinyl pyrrolidone and half esters of unsaturated dicarboxylic acids possess unique film forming properties allowing them to be successfully employed in hair spray compositions.

The N-vinyl lactams employed in accordance with the present invention generally correspond to the formula:

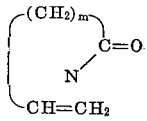

wherein $m$ is an integer of 3–5. Such lactams include the pyrrolidones, e.g., N-vinylpyrrolidone and substituted derivative thereof, the valerolactams, e.g., N-vinyl-γ-valerolactams and derivatives thereof, and the caprolactams, e.g., N-vinyl-ε-caprolactams and derivatives thereof, etc.

The novel copolymers of the present invention are preferably prepaired by copolymerizing N-vinylpyrrolidone or C-substituted derivatives thereof (particularly a C-alkyl substituted N-vinyl-2-pyrrolidone) and a half ester of an unsaturated dicarboxylic acid. Suitable N-vinyl pyrrolidone components of the preferred embodiment of the present invention include:

N-vinyl-2-pyrrolidone
N-vinyl-3-methyl-2-pyrrolidone
N-vinyl-4-ethyl-2-pyrrolidone
N-vinyl-3-t-butyl-2-pyrrolidone
N-vinyl-3,4-dimethyl-2-pyrrolidone
N-vinyl-3-methoxy-2-pyrrolidone
N-vinyl-5-ethoxy-2-pyrrolidone
N-vinyl-4-t-butoxy-2-pyrrolidone
N-vinyl-3-isopropoxy-2-pyrrolidone
N-vinyl-3,4-dimethoxy-2-pyrrolidone
N-vinyl-3-hydroxymethyl-2-pyrrolidone
N-vinyl-5-hydroxymethyl-2-pyrrolidone
N-vinyl-3-hydroxyethyl-2-pyrrolidone
N-vinyl-ε-caprolactam
N-vinyl-γ-valerolactam
N-vinyl-3-methyl-ε-caprolactam
N-vinyl-3-methyl-γ-valerolactam, etc.

The half esters of the unsaturated dicarboxylic acids copolymerized with the vinyl pyrrolidone in accordance with the process of the present invention are generally half esters of lower unsaturated dicarboxylic acids, specifically half esters of such acids as: maleic, fumaric, itaconic, citraconic, mesaconic, etc. A preferred unsaturated dicarboxylic acid half ester is the half ester of maleic acid.

The ester portion of the half ester of the unsaturated dicarboxylic acid employed as a copolymer in the polymerization process of the present invention is the residue of an aliphatic, cycloaliphatic, aromatic, or heterocyclic alcohol. Thus, the ester moiety of the half ester of the unsaturated dicarboxylic acid can comprise any of the following exemplary radicals: aliphatic—methyl, ethyl, isopropyl, n-propyl, n-butyl, t-butyl, n-amyl, iso-amyl, n-hexyl, n-heptyl, n-octyl, iso-octyl, 2-ethylhexyl, oxo-octyl, n-nonyl, oxo-nonyl, n-decyl, iso-decyl, n-dodecyl, acids produced in accordance with the present invention are as follows:

| Vinyl pyrrolidone monomer, A | Half ester of unsaturated dicarboxylic acid, B | Weight ratio, percent A/B |
|---|---|---|
| N-vinyl-2-pyrrolidone | Monobutyl maleate | 80/20 |
| Do | Mono-2-ethylhexyl maleate | 80/20 |
| Do | do | 70/30 |
| N-vinyl-3-methyl-2-pyrrolidone | Monoethyl itaconate | 90/10 |
| N-vinyl-3-t-butyl-2-pyrrolidone | Mono-t-butyl itaconate | 60/40 |
| N-vinyl-2-pyrrolidone | Monobutyl fumarate | 80/20 |
| N-vinyl-3-methoxy-2-pyrrolidone | Mono-n-hexyl fumarate | 60/40 |
| N-vinyl-2-pyrrolidone | Monostearyl maleate | 40/60 |
| Do | Monostearyl itaconate | 80/20 |
| Do | Monobutyl citraconate | 80/20 |
| Do | Mono-oxooctyl citraconate | 70/30 |
| Do | Monobutyl mesaconate | 90/10 |
| N-vinyl-5-ethyl-2-pyrrolidone | Monomethyl mesaconate | 30/70 | n-tridecyl, lauryl, stearyl, n-hexadecyl, n-octadecyl, eicosyl, etc.; cycloaliphatic—cyclohexyl, etc.; aromatic—benzyl, etc.; heterocyclic—tetrahydrofurfuryl, furfuryl, etc.

Of the above, lower alkyl radicals derived from lower aliphatic alcohols are preferred.

The monoesters of the unsaturated dicarboxylic acids employed as one monomer in the copolymerization of the present invention can be prepared by any process well known in the art. Thus, for example, such esters can be readily prepared by heating essentially equimolar amounts of the appropriate alcohol and the unsaturated dicarboxylic acid or anhydride at about 40 to 80° until the monoester is prepared by esterification of one of the carboxylic groups of the unsaturated dicarboxylic acid or anhydride. Again, such process and similar processes are well known in the art.

The novel copolymers of the present invention generally comprise the vinyl lactam monomer and half ester monomer in a ratio of from 1:1 to 99:1, a ratio of 7.3 to 9:1 being preferred.

The polymerization of vinyl pyrrolidone and the half ester of the unsaturated dicarboxylic acid can be conducted in the presence of any of the known polymerization catalysts generally employed for the polymerization of the vinyl pyrrolidone and similar materials. Thus, again reference is made to U.S. Pats. 2,980,654 and 2,999,853 which show the copolymerization of vinyl pyrrolidone and dialkyl maleates and fumarates, etc.

A particularly preferred catalyst to be employed in the polymerization process of the present invention comprises azo-bis-isobutyronitrile. Additionally, peroxide catalysts such as hydrogen peroxide, benzoyl peroxide, di-tert-butyl peroxide, dilauroyl peroxide, etc. can be employed.

The copolymerizatiton process of the present invention is generally carried out in a solvent in which both the vinyl pyrrolidone monomer and half ester of unsaturated dicarboxylic acid monomer are soluble. Lower alcohols are very suitable and convenient solvents for the purposes of the present invention. Specifically, ethanol and isopropanol are found to be particularly suitable.

In the copolymerizatiton process of the present invention the temperature and pressure of reaction are not in any way critical. Generally, it is convenient to operate the copolymerization system at or near the reux temperature of the system. Accordingly, temperatures of about 60° C. to about 80° C. are generally employed, a temperature of approximately 70° C. being preferred. Again, it is noted that the temperature of reaction is in no way critical, and slightly lower or higher temperatures do not adversely affect the yield, purity, or molecular weight of the polymer that is produced. Similarly, pressures at or near atmospheric pressure are generally employed in the process of the present invention. Here again, it has been found that slightly lower or higher pressures do not adversely affect the product that is produced.

Exemplary high molecular weight copolymers of vinyl pyrrolidone and half esters of unsaturated dicarboxylic As noted previously, the copolymers of the present invention are unexpectedly superior to conventional copolymers prepared by copolymerizing N-vinyl pyrrolidone and an unsaturated dicarboxylic acid anhydride, e.g., maleic anhydride, in that higher molecular weight copolymers are produced in accordance with the present invention and the copolymers of the present invention do not suffer from the discoloration associated with copolymers of unsaturated dicarboxylic acid or anhydrides with vinyl pyrrolidone.

As will be evident hereinafter, the molecular weight improvement over the prior art is apparent from the viscosity measurements in the examples which follow. Of course, mixtures of monomers, such as mixtures of pyrrolidone monomers and/or mixtures of half ester monomers can be advantageously employed.

The following specific examples illustrate various embodiments of the present invention. It is to be noted, however, that such examples are presented for purposes of illustration only, and the present invention is in no way to be deemed as limited thereby.

EXAMPLE I

Copolymer of vinylpyrrolidone and monobutyl maleate—80/20 wt. ratio

Butyl alcohol, 436 g., was placed in a 2 liter kettle equipped with mechanical stirrer, reflux condenser, nitrogen inlet tube and thermometer. Maleic anhydride, 588 g., was added, agitation was started, and the kettle was purged with nitrogen. The mixture was heated to 60° C. and this temperature was maintained for 4 hours, using intermittent cooling. After four hours the acid number was 325.1 (theory: 325).

Twenty grams of this material (monobutyl maleate) was placed in a 1 liter kettle, equipped as described above. N-vinyl-2-pyrrolidone, 80 g., 100 g. ethanol SD-40 anhydrous, and 0.7 g. azo-bis-isobutyronitrile (AIBN) were added, and the kettle was thoroughly purged with nitrogen. Agitation was started, and the temperature was raised slowly to 85–87° C., at which temperature the material refluxed vigorously. The reflux temperature subsequently dropped to 81–82° C., which was maintained for 6 hours. After that the batch was cooled to room temperature and it was discharged.

*Analysis.*—Solids, 49.4%; intr. viscosity, 0.31; relative viscosity, 1.342.

EXAMPLE II

Copolymer VP and monobutyl maleate—80/20 wt. ratio

When the initiator level presented in Example I was decreased from 0.7 g. to 0.3 g., a product was obtained with a significantly higher intrinsic viscosity, i.e., 0.79 rather than 0.31.

EXAMPLE III

Copolymer of vinyl pyrrolidone and mono-2-ethylhexyl maleate—80/20 wt. ratio 2-ethylhexanol, 338 g., was placed in a 2 liter kettle equipped with mechanical stirrer, reflux condenser, nitrogen inlet and thermometer. Maleic anhydride, 265 g., was added, and the system was purged with nitrogen. The temperature was raised slowly to 60° C., where the mixture was maintained for 6 hours. At this point the acid number was 254 (theory: 246). The material was cooled and discharged.

Mono-ethylhexyl maleate, 80 g., was placed in a 2 liter kettle equipped as described above, together with 320 g., N-vinyl-2-pyrrolidone and 400 g. ethanol SD–40 anhydrous. Agitation was started, 1.32 g. azo-bis-isobutyronitrile and 2.7 g. hydrogen peroxide (35%) was introduced, and the system was purged thoroughly with nitrogen. The mixture was heated slowly to 85° C. Gentle reflux was maintained for 6 hours. Then the material was cooled to room temperature, and discharged through a 200 mesh screen.

*Analysis.*—Solids, 50.22%; residual monomer, 0.26%; K-value, 25.8; intr. viscosity, 0.17; relative viscosity, 1.185; Brookfield viscosity, 26,500 cps.

EXAMPLE IV

Copolymer of VP and mono-2-ethylhexyl maleate— 70/30 wt. ratio

When the same technique was used as above, but a 70/30 wt. ratio of VP/mono-2-ethylhexyl maleate was used a product was obtained with an intrinsic visc. of 0.18.

EXAMPLE V

Copolymer of vinyl pyrrolidone and monoamyl maleate—80/20 wt. ratio

Amyl alcohol, 1720 g., was charged into a 5 liter kettle equipped with mechanical stirrer, reflux condenser, nitrogen inlet tube and thermometer. Agitation was started, the system was purged with nitrogen, and 1960 g. maleic anhydride was added. The temperature of the mixture was slowly raised to 60° C. where it was maintained with intermittent cooling for 9½ hours. At this point the acid number was 303.4 (theory: 301).

Above material—monoamyl maleate—80 g., was charged into a 2 liter kettle together with 320 g. N-vinyl-2-pyrrolidone, 380 g. ethanol SD–40 anhydrous, and 20 g. isopropanol. The system was thoroughly purged with nitrogen, then 2.64 g. azo-bis-isobutyronitrile and 1.8 g. hydrogen peroxide (35%) were introduced. The temperature was raised cautiously to 85° C. The heavy reflux was controlled by ice-cooling. The mixture was kept in gentle reflux for 6 hours. After that it was cooled and discharged.

*Analysis.*—Solids, 50.23%; residual monomer, 0.19%; K-value, 30.3; intr. viscosity, 0.229; relative viscosity, 1.247; Brookfield viscosity, 79,500 cps.

EXAMPLE VI

Copolymers of the following monomers were produced as in Example I.

marily with respect to the foregoing specific examples, it is to be understood that the present invention is in no way to be deemed as limited thereto but should be construed as broadly as all or any equivalents thereof.

What is desired to be protected by Letters Patent is:

1. A film forming copolymer of (A) N-vinyl lactam or alkyl, alkoxy or hydroxyalkyl substituted derivatives thereof and (B) a half ester of an unsaturated dicarboxylic acid and an aliphatic, aromatic, cycloaliphatic or heterocyclic alcohol, the ratio of (A) to (B) being from 1:1 to 99:1.

2. The copolymer of claim 1 wherein said N-vinyl lactam comprises N-vinyl pyrrolidone.

3. The copolymer of claim 2 wherein the ratio of (A) to (B) is from 7:3 to 9:1.

4. The copolymer of claim 3 wherein (A) comprises N-vinyl pyrrolidone and (B) comprises a half ester of unsaturated dicarboxylic acid selected from maleic, fumaric, mesaconic and citraconic itaconic acids and an aliphatic alcohol.

5. The copolymer of claim 3 wherein said aliphatic alcohol comprises a lower alcohol.

6. The copolymer of claim 5 wherein (B) comprises monobutyl maleate.

7. The copolymer of claim 4 wherein (B) comprises mono-2-ethylhexyl maleate.

8. The copolymer of claim 4 wherein (B) comprises monoamyl maleate.

9. A process for producing film forming copolymers which comprises reacting (A) N-vinyl pyrrolidone or substituted derivatives thereof and (B) a half ester of an unsaturated dicarboxylic acid and an aliphatic, aromatic, cycloaliphatic or heterocyclic alcohol, the ratio of (A) to (B) being from 1:1 to 99:1.

10. The process of claim 9 wherein the ratio of (A) to (B) is from 7:3 to 9:1.

11. The process of claim 10 wherein (A) comprises N-pyrrolidone and (B) comprises a half ester of an unsaturated dicarboxylic acid selected from maleic, fumaric itaconic, mesaconic and citraconic acids and an aliphatic alcohol.

12. The process of claim 11 wherein said aliphatic alcohol comprises a lower alcohol.

13. The process of claim 12 wherein (B) comprises monobutyl maleate.

14. The process of claim 12 wherein (B) comprises mono-2-ethylhexyl maleate.

15. The process of claim 12 wherein (B) comprises monoamyl maleate.

EXAMPLE VI

| Vinyl pyrrolidone monomer, A | Half ester of unsaturated dicarboxylic acid, B | Ratio, percent A/B |
|---|---|---|
| N-vinyl-2-pyrrolidone | Mono-2-ethylhexy maleate | 80/20 |
| Do | do | 80/20 |
| N-vinyl-3-t-butyl-2-pyrrolidone | Mono-t-butyl itaconate | 60/40 |
| N-vinyl-3-methoxy-2-pyrrolidone | Mono-n-hexyl fumarate | 60/40 |
| N-vinyl-2-pyrrolidone | Monostearyl maleate | 40/60 |
| Do | Mono-oxo-octyl citraconate | 70/30 |
| N-vinyl-5-ethyl-2-pyrrolidone | Monoethyl mesaconate | 30/70 |

As noted above, the novel copolymers of vinyl pyrrolidone and half esters of unsaturated dicarboxylic acid find exceptional utility in film forming hair spray formulations. The copolymers of the present invention, however, can be also effectively employed in corrosion resistant coatings, or as additives for lubricating oils, gasolines, etc.

While the present invention has been described pri-

References Cited
UNITED STATES PATENTS 2,980,654   4/1961   Perry _____ 260—78.5

JOSEPH L. SCHOFER, Primary Examiner

JOHN KIGHT, Assistant Examiner

U.S. Cl. X.R.

44—63; 106—14; 167—87

PO-1050
(5/69)

UNITED STATES PATENT OFFICE
CERTIFICATE OF CORRECTION

Patent No. 3,511,817            Dated May 12, 1970

Inventor(s) MARVIN M. FEIN ET AL

It is certified that error appears in the above-identified patent and that said Letters Patent are hereby corrected as shown below:

Column 2, lines 21 to 25, for structural formula

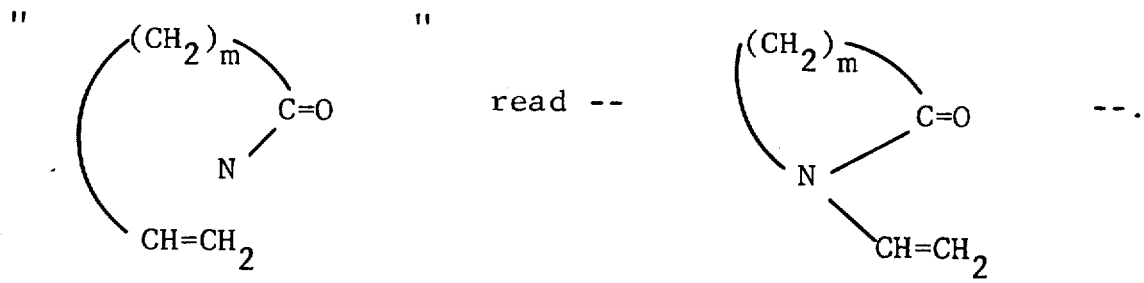

Claim 11, line 2, for "N-pyrrolidone" read -- N-vinyl-pyrrolidone --.

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents